UNITED STATES PATENT OFFICE.

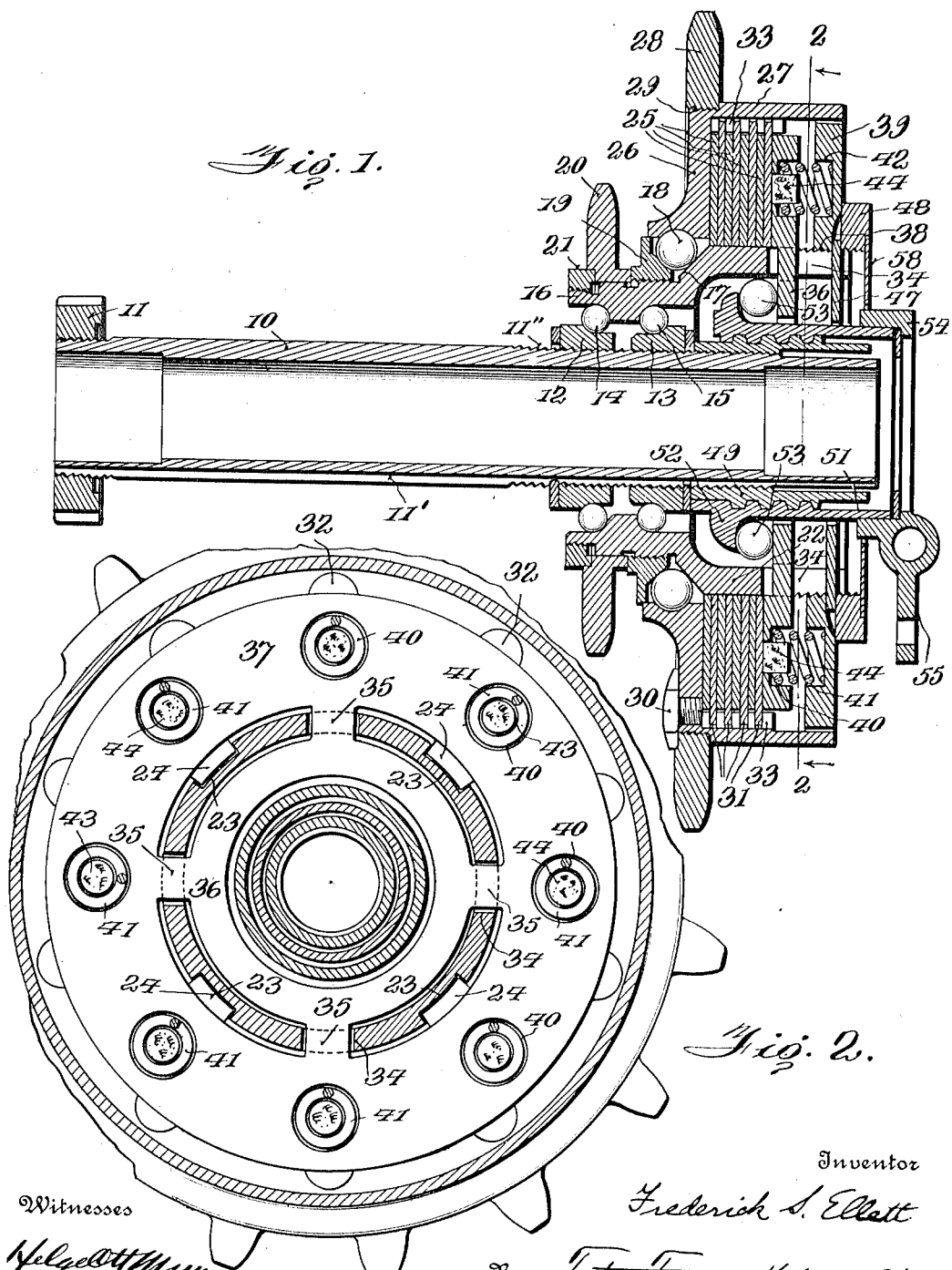

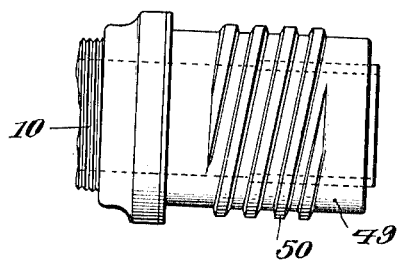
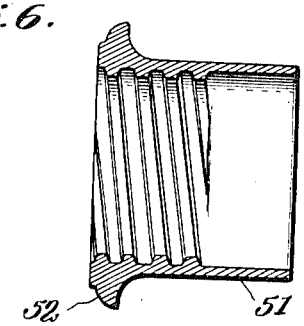
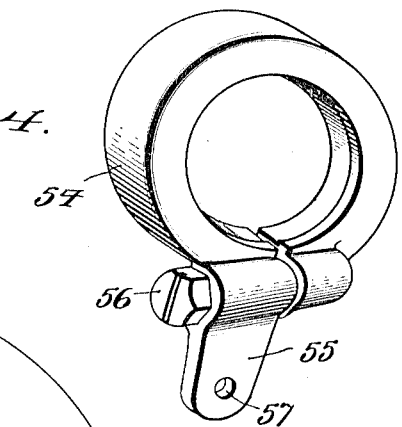
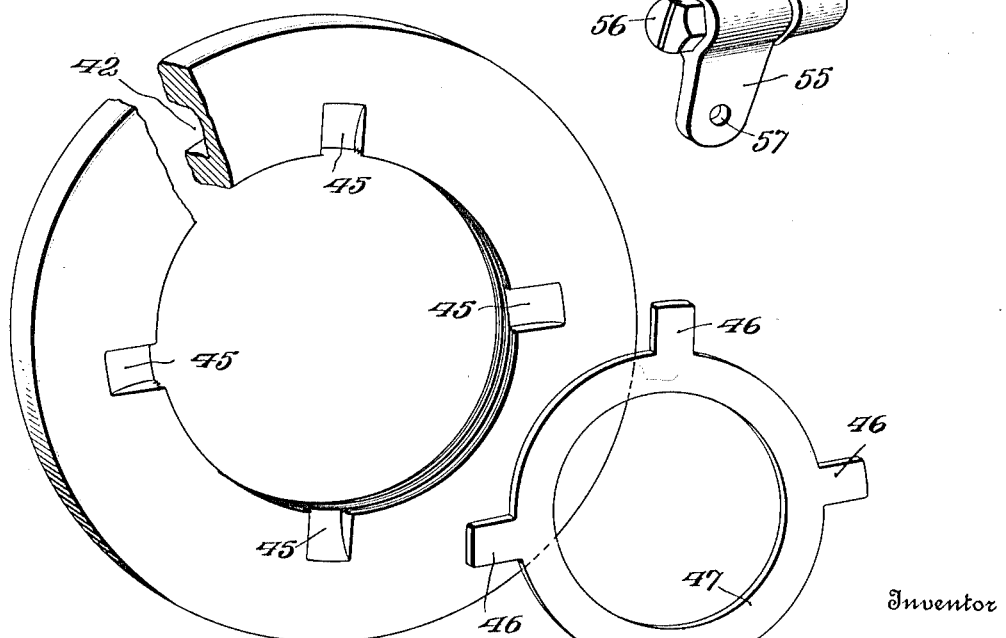

FREDERICK S. ELLETT, OF ELMIRA, NEW YORK.

CLUTCH.

1,071,992.

Specification of Letters Patent.

Patented Sept. 2, 1913.

Application filed April 15, 1912. Serial No. 690,755.

*To all whom it may concern:*

Be it known that I, FREDERICK S. ELLETT, a citizen of the United States, residing at Elmira, county of Chemung, State of New York, have invented certain new and useful Improvements in Clutches, of which the following is a specification.

This invention relates to clutches and more particularly to friction clutches of the multiple disk type and has for its object the provision of a clutch which is applicable to motorcycles and which is simple in construction, durable, effective in operation and conveniently adjustable.

The invention is illustrated in the accompanying drawings, in which:

Figure 1 is a longitudinal section. Fig. 2 is a section on the line 2—2 of Fig. 1. Fig. 3 is a perspective view of the adjusting ring and the locking washer therefor. Fig. 4 is a perspective view of the actuating collar. Fig. 5 is a side elevation of the releasing screw. Fig. 6 is a longitudinal section of the releasing nut.

Referring to the drawings 10 indicates a hollow shaft or spindle which is adapted to be secured to the frame of the motorcycle, or to any other suitable support, by means of a nut 11 and a key-way 11′. The spindle 10 is provided with the threads 11″, on which are arranged the ball bearing cones 12 and 13, the threaded connection between these cones and the spindle providing a convenient means for adjusting the cones. Rotatably supported on the cones 12 and 13 by means of the sets of balls 14 and 15 is a sleeve 16. The sleeve 16 is provided with a ball race 17 for the balls 18, the balls being adjusted by means of the cone 19 which has screw threaded engagement with the sleeve. The sleeve 16 also carries a sprocket wheel 20 which may be keyed to the sleeve and held in position thereon by means of a nut 21. The outer end of the sleeve 16 is enlarged as indicated at 22 and provided with longitudinally extending slots 23 in its outer surface, which slots are adapted to receive the projections 24 on the annular friction disks 25, whereby these disks are secured to the sleeve and rotate with the same. Rotatably mounted on the balls 18 is a wheel 26 provided with the axially extending flange 27 which forms, with the outer end of the sleeve 16, an annular chamber for the friction disks. A sprocket wheel 28 may be secured to the wheel 26 in any suitable manner as by means of the threads 29 and the screw 30. Alternately arranged between the disks 25 are the disks 31 having outward extensions 32 which engage suitable recesses 33 on the interior of the flange 27. The sleeve 16 has at its outer end a plurality of axially extending recesses or openings 34, in which are arranged the radially extending arms 35 which connect the inner and outer annular portions 36 and 37 of a pressure plate which is arranged to bear against the outer friction disk 31. The extreme outer end of the sleeve 16 is provided with the external threads 38, by means of which an annular end plate 39 is adjustably connected with the sleeve. The outer annular portion 37 of the pressure plate is provided with a plurality of circular recesses 40 in which are arranged the springs 41, the outer end of these springs being arranged in an annular groove 42 on the inner side of the plate 39. Co-axial with the recesses 40 are openings 43 which extend through the pressure plate and in which are arranged the plugs 44, these plugs being preferably made of cork or wood and serving to hold the springs in place when the end plate 39 is removed.

In order to hold the end plate in position it is provided with notches 45 in the outer side thereof, these notches being adapted to receive the outwardly projecting arms 46 on the lock washer 47. The washer 47 is arranged on the interior of the sleeve 16 and the arms 46 project through the openings 34. A ring nut 48 is arranged on the threaded end of the sleeve 16 as shown in Fig. 1 and serves to hold the washer 47 in position, this ring being secured by screwing the same tightly against the plate 39.

A sleeve 49 has threaded engagement with the spindle 10 and is provided with the external screw threads 50, these threads being preferably of steep pitch. Arranged on the sleeve 49 and provided with internal threads to coöperate with the threads 50 is a sleeve nut 51 having a flange 52 which forms a race for the balls 53, these balls being arranged between said flange and the inner ring 36 of the pressure plate. The nut 51 projects beyond the lock washer 47 and has secured to its outer end a collar 54 provided with an operating arm 55. The collar 54 may be conveniently secured to the nut 51 by having the collar split and adapted to be clamped together by means of a screw 56.

A hole 57 may be provided in the outer end of the arm 55 to form a convenient means for attaching any suitable operating mechanism.

The operation of the mechanism is as follows: When used on a motorcycle the sprocket 28 and the wheel 26 will ordinarily be driven by the engine, and owing to the pressure of the springs 41 on the plate 37, the latter will normally press the friction disks 25 and 31 into gripping engagement and thereby cause the sleeve 16 and the sprocket 20 to rotate with the wheel 26. When it is desired to disconnect the sleeve 16 from the wheel 26 the nut 51 will be turned by means of the collar 54 in a direction to cause the nut to be moved outwardly along the sleeve 49. As the nut 51 moves outwardly it will be seen that the plate 37 will be carried with it and compress the springs 41 and thereby remove the pressure from the friction disks. This will allow the disks to become disengaged and permit the sleeve 16 and the disks 25 to remain stationary or move relative to the disks 31 carried by the wheel 26. By providing the ball bearing between the flange 52 and the ring 36 it is obvious that the ring is adapted to rotate with the sleeve 16 and permit the nut 51 to be stationary. This arrangement provides an effective means for withdrawing the pressure plate from the friction disks. The tension of the springs 41 may be simultaneously varied by screwing the plate 39, either in or out on the sleeve 16, the annular groove 42 permitting the plate 39 to be turned relative to the springs. In order to adjust the plate 39 it is only necessary to take off the nut 48 and the lock washer 47 and then turn the plate in the proper direction. In order to close the space between the collar 54 and the nut 48 and to keep out dust and other foreign substances, a ring 58 may be provided, this ring being preferably secured to the nut 48.

It will be understood that various changes may be made in the details of the mechanism within the scope of the claims, and I therefore do not wish to be limited to the exact details shown and described.

Having thus described the invention what I claim as new and desire to secure by Letters Patent is:

1. In a clutch for motorcycles, the combination of a stationary member, a rotary member mounted on said stationary member, a wheel rotatably mounted on said rotary member, a plurality of friction disks adapted to form a driving connection between said rotary member and said wheel, a plate arranged on the outer end of said rotary member, an axially movable disk carried by said rotary member, a plurality of springs arranged between said axially movable disk and said plate and adapted to normally press said friction disks into gripping engagement, and means independent of the rotation of said rotary member and said wheel adapted to move said axially movable disk so as to release said friction disks.

2. In a clutch for motorcycles, the combination of a stationary member, a rotary member mounted on said stationary member, a wheel rotatably mounted on said rotary member, a plurality of friction disks adapted to form a driving connection between said rotary member and said wheel, a plate adjustably arranged on the outer end of said rotary member, an axially movable disk carried by said rotary member, a plurality of springs arranged between said axially movable disk and said plate and adapted to normally press said friction disks into gripping engagement, and means independent of the rotation of said rotary member and said wheel adapted to move said axially movable disk so as to release said friction disks.

3. In a clutch for motorcycles, the combination of a stationary member, a rotary member mounted on said stationary member, a wheel rotatably mounted on said rotary member and having an axially extending flange adapted to form an annular chamber surrounding said rotary member, a plate mounted on said rotary member and adapted to form a closure for said chamber, a plurality of friction disks arranged in said chamber and adapted to form a driving connection between said wheel and said rotary member, an axially movable disk arranged between said friction disks and said plate, a spring bearing against said disk and said plate and adapted to move said friction disks into gripping engagement, a stationary cam member mounted on said stationary member, and a movable cam member engaging said stationary cam member and connected with said axially movable plate whereby the movement of said cam member is adapted to move said axially movable member toward said end plate to release said friction disks.

4. In a clutch for motorcycles, the combination of a stationary member, a rotary member mounted on said stationary member, a wheel rotatably mounted on said rotary member, a plurality of friction disks adapted to form a driving connection between said wheel and said rotary member, a plate adjustably mounted on said rotary member, an axially movable member arranged between said plate and said friction disks and provided with a plurality of recesses, said plate having an annular groove therein, a plurality of springs having one end in said recesses and the other end in said groove and adapted to move said friction disks into gripping engagement, and means independent of the rotations of said wheel and said rotary member adapted to move said axially movable member to release and engage said friction disks.

5. In a clutch for motorcycles, the combination of a stationary member, a rotary member mounted on said stationary member, a wheel rotatably mounted on said rotary member, a plurality of friction disks adapted to form a driving connection between said wheel and said rotary member, a plate carried by said rotary member, a plurality of springs for normally pressing said friction disks into gripping engagement, means independent of the rotations of said wheel and said rotary member for compressing said springs to release said friction disks, and means whereby said plate may be adjusted to simultaneously vary the tension of said springs.

6. In a clutch for motorcycles, the combination of a stationary member, a rotary member mounted on said stationary member, a wheel rotatably mounted on said rotary member, a plurality of friction disks carried by said rotary member, a plurality of friction disks carried by said wheel and alternately arranged with respect to the first-mentioned disks, a member having screw-threaded connection with said rotary member, means for locking said member in position, a plurality of springs bearing against said last-mentioned member and adapted to normally press said friction disks into gripping engagement, and means independent of the rotations of said wheel and said rotary member adapted to compress said springs to release said friction disks.

7. In a clutch for motorcycles, the combination of a stationary member, a rotary member mounted on said stationary member and provided with an opening in one end thereof, a wheel rotatably mounted on said rotary member, a plurality of friction disks adapted to form a driving connection between said wheel and said rotary member, a plate mounted on said rotary member, an axially movable plate having an arm extending through said opening, a ring carried by said arm, a plurality of springs arranged between said plates and adapted to normally press said friction disks into gripping engagement, a stationary cam member carried by said stationary member, a revoluble cam member engaging said stationary cam member, and a thrust bearing between said revoluble cam member and said ring.

8. In a clutch for motorcycles, the combination of a stationary member, a rotary member mounted on said stationary member and provided with an opening in one end thereof, a wheel rotatably mounted on said rotary member, a plurality of friction disks adapted to form a driving connection between said wheel and said rotary member, a plate having screw threaded connection with said rotary member, an axially movable plate between said first-mentioned plate and said disks and having an arm extending through said opening, a ring carried by said arm on the interior of said rotary member, a member arranged on the interior of said rotary member and having an arm extending through said opening and adapted to lock said first-mentioned plate in position on said rotary member, a spring arranged between said plates and adapted to normally press said friction disks in gripping engagement, means arranged on said stationary member for releasing said clutch disk, and a thrust bearing between said means and said ring.

In testimony whereof I affix my signature in presence of two witnesses.

FREDERICK S. ELLETT.

Witnesses:
A. C. RICE,
LEAH M. JOHNSON.